(12) United States Patent
Yamada et al.

(10) Patent No.: US 10,110,086 B2
(45) Date of Patent: Oct. 23, 2018

(54) MOTOR AND FEMALE CONNECTOR

(71) Applicant: Tyco Electronics Japan G.K., Kanagawa (JP)

(72) Inventors: Shinji Yamada, Kanagawa (JP); Yusuke Okada, Kanagawa (JP)

(73) Assignee: Tyco Electronics Japan G.K., Kanagawa (JP)

( * ) Notice: Subject to any disclaimer, the term of this patent is extended or adjusted under 35 U.S.C. 154(b) by 232 days.

(21) Appl. No.: 14/836,602

(22) Filed: Aug. 26, 2015

(65) Prior Publication Data

US 2016/0065031 A1 Mar. 3, 2016

(30) Foreign Application Priority Data

Aug. 27, 2014 (JP) ................................. 2014-172767

(51) Int. Cl.
*H02K 11/00* (2016.01)
*H02K 5/22* (2006.01)

(52) U.S. Cl.
CPC ......... *H02K 5/225* (2013.01); *H02K 2203/03* (2013.01)

(58) Field of Classification Search
CPC ........................... H02K 5/225; H02K 2203/03
USPC .......................................................... 310/71
See application file for complete search history.

(56) References Cited

U.S. PATENT DOCUMENTS

| 8,350,426 B2 * | 1/2013 | Tanaka ................... H02K 5/225 310/43 |
| 8,378,540 B2 | 2/2013 | Furukawa et al. | |
| 2010/0237721 A1 * | 9/2010 | Ishizue .................... H02K 5/08 310/43 |
| 2011/0006625 A1 * | 1/2011 | Fujii ...................... H02K 3/522 310/71 |
| 2013/0099611 A1 * | 4/2013 | Suga ...................... H02K 5/225 310/71 |
| 2014/0021814 A1 * | 1/2014 | Seidenbinder ....... H02K 11/048 310/71 |
| 2014/0070647 A1 * | 3/2014 | Kawamata ............. H02K 3/525 310/71 |
| 2015/0137635 A1 * | 5/2015 | Firat ..................... H02K 3/522 310/71 |
| 2016/0049844 A1 * | 2/2016 | Yasumoto ................. B60S 1/08 310/71 |
| 2016/0052613 A1 * | 2/2016 | Anderson ............ B63H 5/1252 440/6 |

FOREIGN PATENT DOCUMENTS

| JP | 62-145461 A | 9/1987 |
| JP | 9-289751 A | 11/1997 |
| JP | 2002-367696 A | 12/2002 |
| JP | 2013207824 A | 10/2013 |

OTHER PUBLICATIONS

Japanese Office Action, dated Jan. 30, 2018, 3 pages.

* cited by examiner

*Primary Examiner* — Forrest M Phillips
(74) *Attorney, Agent, or Firm* — Barley Snyder (57) ABSTRACT

A motor is provided with a circuit board that is connected to a coil of a stator. A male connection portion is formed in part of the outer periphery of the circuit board. A casing accommodates the circuit board. The male connection portion is exposed to the outside from an opening formed in the casing. A female connector is connected to a cable and is able to engage with the male connection portion.

8 Claims, 13 Drawing Sheets

MOTOR AND FEMALE CONNECTOR

CROSS-REFERENCE TO RELATED APPLICATIONS

This application claims the benefit of the filing date under 35 U.S.C. § 119(a)-(d) of Japanese Patent Application No. 2014-172767 filed on Aug. 27, 2014.

FIELD OF THE INVENTION

The present invention relates to a motor and a female connector used with the motor.

BACKGROUND

Servomotors are conventionally used as drive sources in machine tools and the like. Inner rotor-type motors are generally used as these servomotors. One example of a rotor-type motor is described in Japanese Unexamined Patent Application Publication No. 2011-167054.

The motor described in Japanese Unexamined Patent Application Publication No. 2011-167054 has a rotatably supported rotor and a stator arranged outside of the rotor. The stator is provided with a stator core, an insulator that covers the stator core, and coils that are wound around a plurality of teeth of the stator core. The coils of the stator are connected to a circuit board that is mounted on the insulator. An external power supply-use connector is mounted on the circuit board. A cable connector that is connected to a power supply-use cable from an external power supply device is engaged with this external power supply-use connector and power is supplied to the motor via the external power supply-use connector.

The motor described in Japanese Unexamined Patent Application Publication No. 2011-167054 has the following problems. The number of components is high due to a cable connector and a motor-side external power supply-use connector being required to connect a power supply-use cable and a motor-side circuit board. Furthermore, not only is the number of components high, but the number of assembly man-hours is also high due to the need to mount the motor-side external power supply-use connector on the circuit board.

SUMMARY

Accordingly, the present invention is intended to solve the above-noted problems, the objective thereof being to provide a motor and a female connector used with the motor, whereby it is possible to reduce the number of components and the number of assembly man-hours when a cable and a motor-side circuit board are connected. In order to achieve the aforementioned objective, a motor, according to an aspect of the present invention, includes a casing having an opening, a stator having coils within the casing, a rotor within the casing, and a circuit board within the casing connected to the coils of a stator. Also included in the present invention are a male connection portion in the opening of the casing integral with the circuit board and accessible from outside the casing and a female connector connected to a cable engaged with the male connection portion.

Furthermore, according to another aspect of the present invention, the female connector has a female contact that is engaged with the male connection portion.

As a result, when connecting the cable and the motor-side circuit board, it is sufficient to engage the female connector with the male connection portion that is integral with the outer periphery of the circuit board. It is not necessary to provide a connector on the motor-side circuit board. Thus, the number of components can be reduced and also the number of assembly man-hours can be reduced as it is not necessary to carry out work to mount a connector on the motor-side circuit board.

DETAILED DESCRIPTION OF THE EMBODIMENT(S)

Hereinafter, embodiments of the present invention will be described with reference to the drawings.

Figure 1:
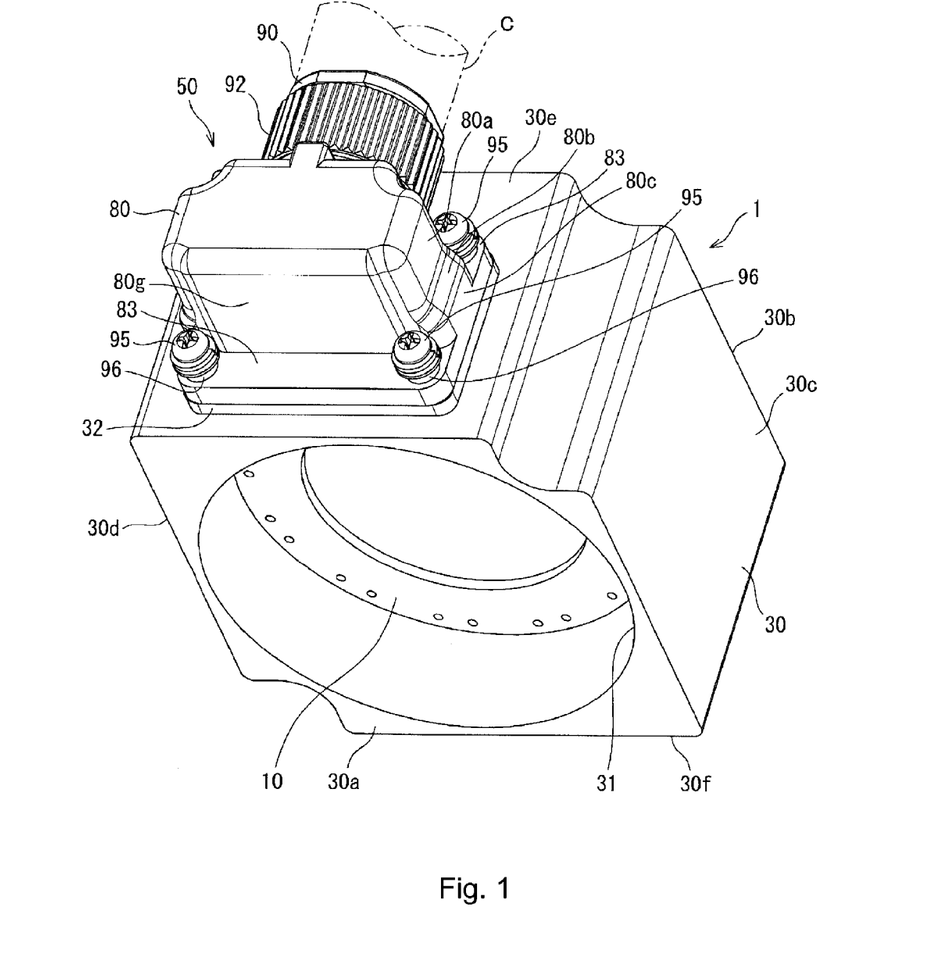
FIG. 1 is a perspective view of a female connector engaged with a male connection portion of a motor according to the present invention with the female connector attached to the motor.
Figure 2:
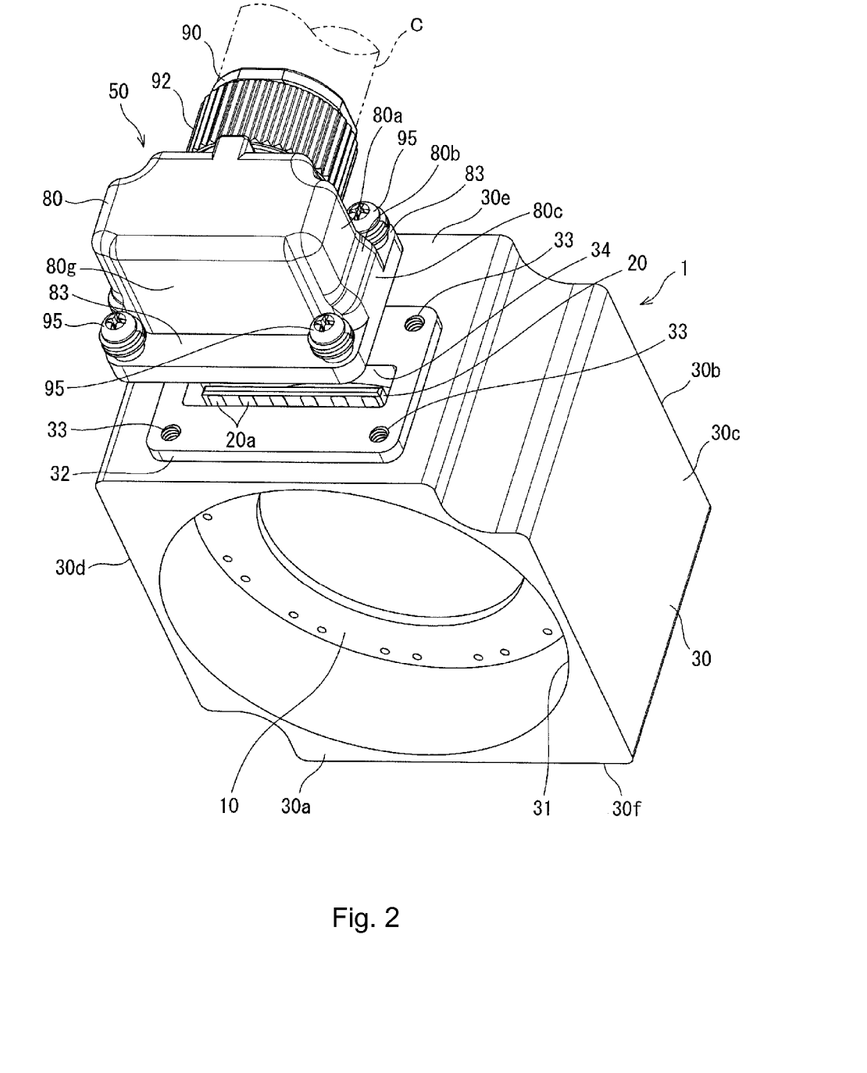
FIG. 2 is a perspective view of the motor and the female connector in FIG. 1 separated.

FIGS. 1 and 2 illustrate a female connector 50 and a male connection portion 20 of a motor 1. In FIG. 1, the female connector 50 is attached to the male connection portion 20 of the motor 1, while in FIG. 2, the female connector 50 and the male connection portion of the motor 1 are separated. The motor 1 illustrated in FIG. 1 is an inner rotor-type motor and is provided with a stator that is not depicted, a rotor that is not depicted, coils that are not depicted, and lead out from the stator, and a circuit board 10 that is connected to the coils of the stator. The stator, the rotor, the coils, and the circuit board 10 are accommodated inside a casing 30.

Figure 3:
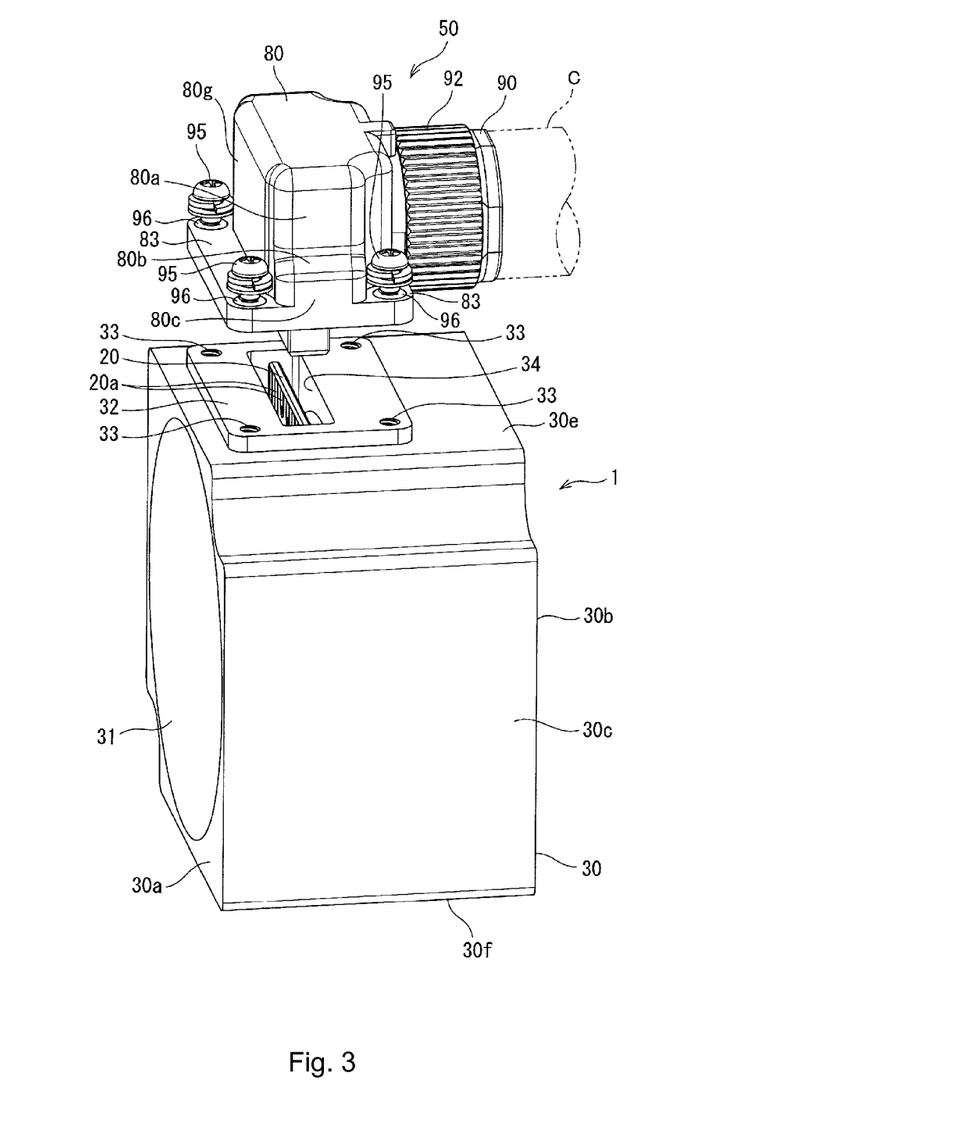
FIG. 3 is another perspective view of the motor and the female connector in FIG. 1 separated.
Figure 4:
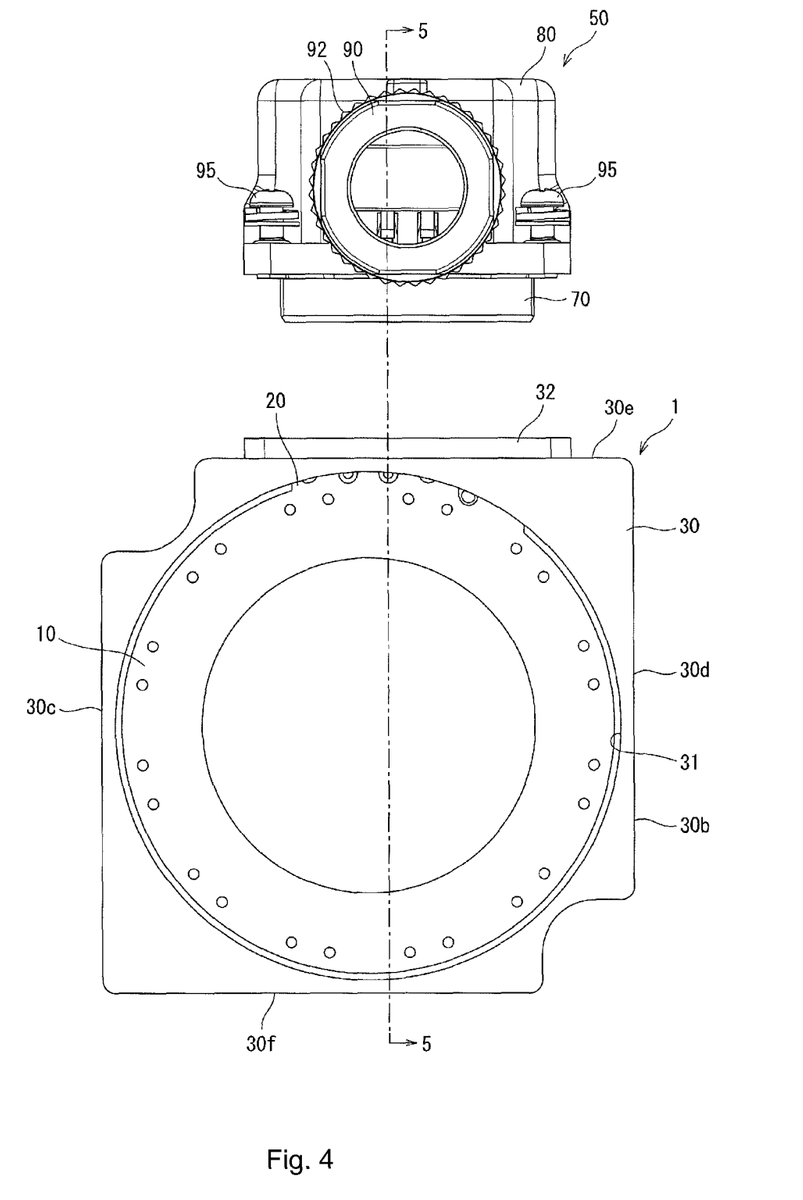
FIG. 4 is a rear view of the motor and the female connector in FIG. 1 separated.
Figure 5:
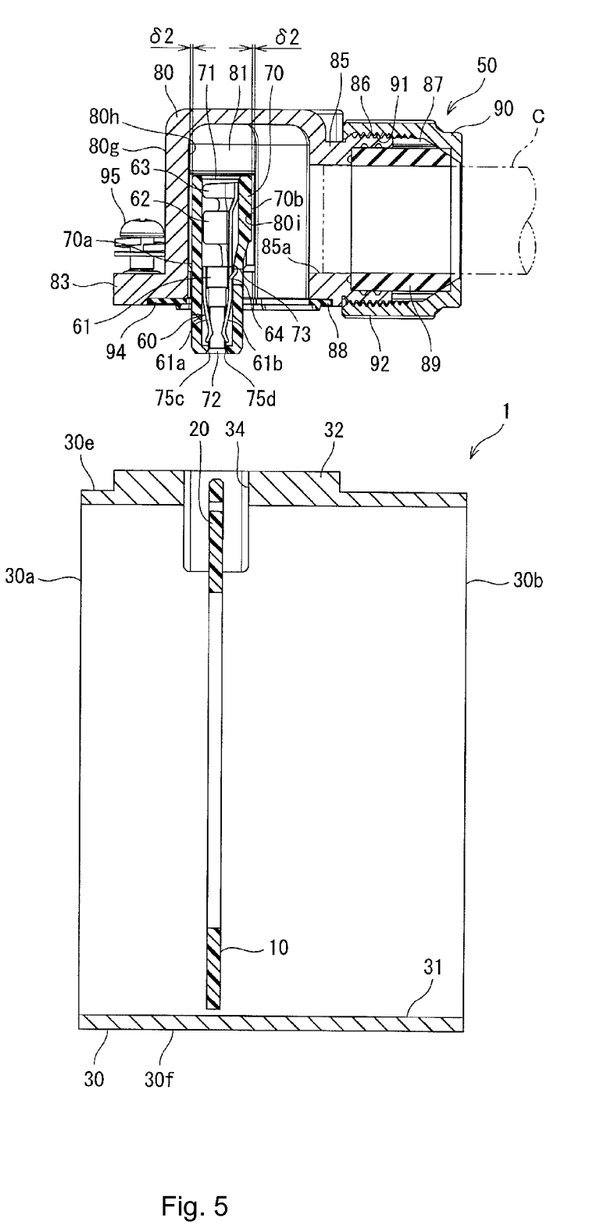
FIG. 5 is a cross-sectional view taken along line 5-5 in FIG. 4.
Figure 6:
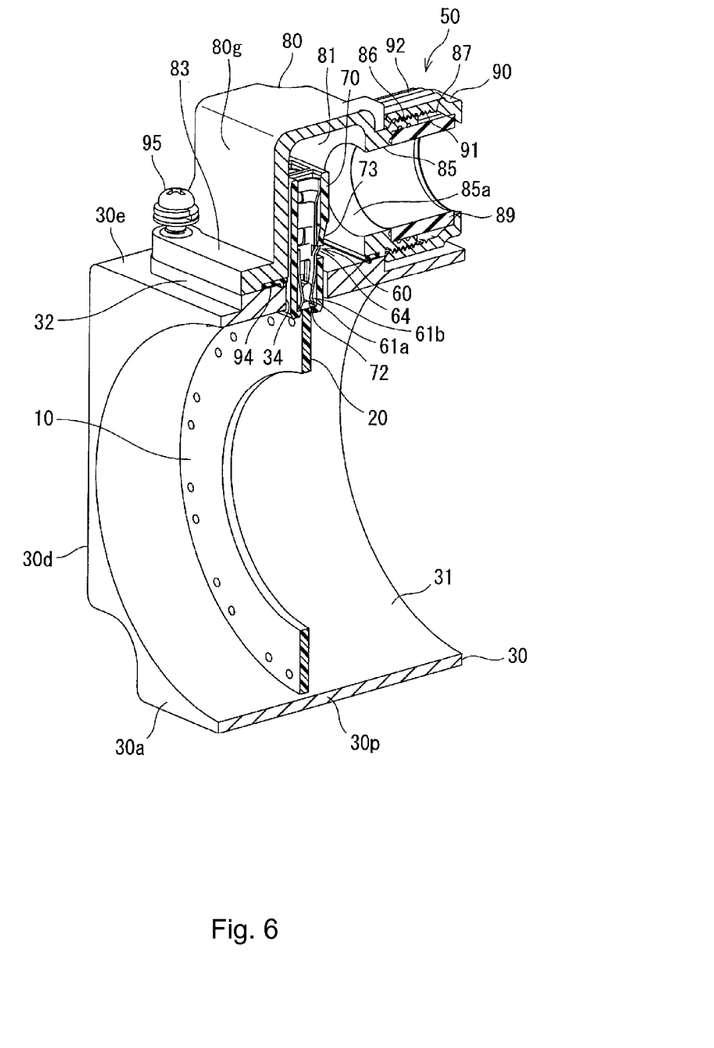
FIG. 6 is a perspective view illustrating a vertical cross-section of the motor and the female connector in FIG. 1.
Figure 7:
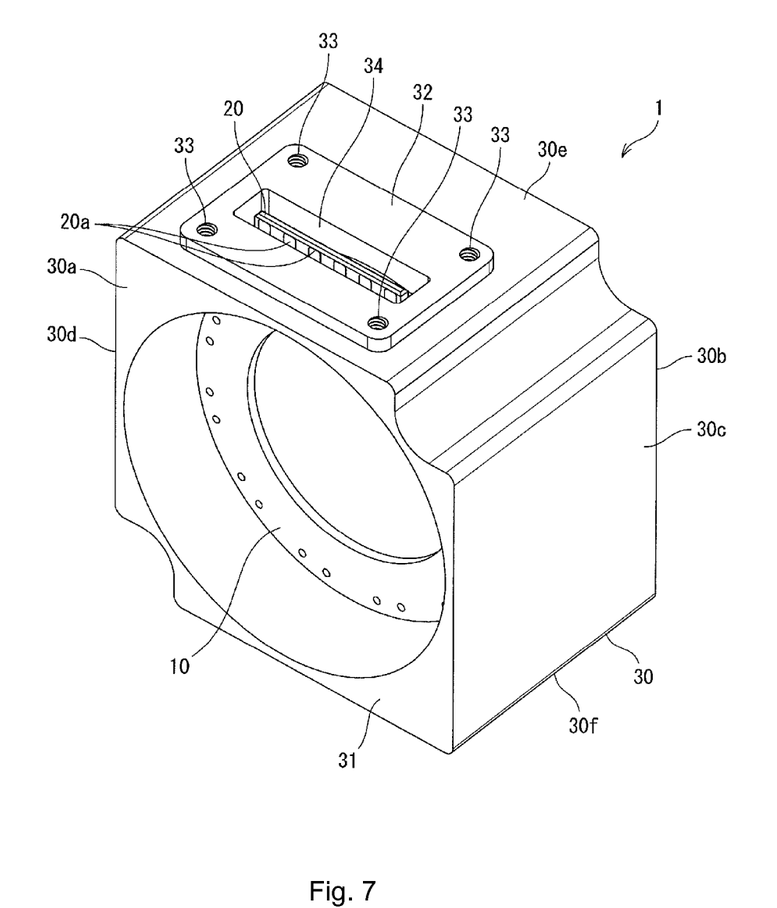
FIG. 7 is a perspective view of the motor illustrated in FIG. 1 as seen from the front surface side.

The casing 30 is a substantially cuboid-shaped metal member that has a front surface 30a, a rear surface 30b, a right side surface 30c, a left side surface 30d, an upper surface 30e, and a bottom surface 30f. A through hole 31 that passes through from the front surface 30a to the rear surface 30b is formed in the casing 30. The stator, the rotor, the coils, and the circuit board 10 are accommodated inside the through hole 31 of the casing 30. An attachment portion 32 having a substantially rectangular shape when seen from above is formed on the upper surface 30e of the casing 30 in a form that protrudes upwards from the upper surface 30e, as illustrated in FIGS. 1 to 7. It should be noted that the attachment portion 32 does not have to protrude from the upper surface 30e of the casing 30. Four female threaded portions 33 for attaching the female connector 50 are formed, for example, in the four corners of the attachment portion 32 as illustrated in FIGS. 2, 3, and 7. The female connector 50 is attached to the attachment portion 32 by four male screws 95 as illustrated in FIGS. 1 and 6. It should be noted that the number of female threaded portions 33 and male screws 95 may be two or six or the like. A rectangular-shaped opening 34 that passes through from the upper surface of the attachment portion 32 to the through hole 31 in the casing 30 is formed in a central portion when seen from above the attachment portion 32, as illustrated in FIGS. 2, 3, 5, 6 and 7. It should be noted that the opening 34 may have a shape other than a rectangular shape, such as an irregular shape.

The circuit board 10 has annular plate shape and is attached to an end of the stator. As illustrated in FIG. 5, the circuit board 10 is accommodated inside the casing 30 such that the front surface of the circuit board 10 faces the front surface 30a of the casing 30 and the rear surface of the circuit board 10 faces the rear surface 30b of the casing 30. The coils of the stator are made up of a U-phase coil, a V-phase coil, and a W-phase coil. End portions of the U-phase coil, V-phase coil, and W-phase coil are connected, respectively, to a plurality of conduction portions (not depicted) provided on the circuit board 10.

Also, the male connection portion 20 is formed in part of the outer periphery of the circuit board 10, namely the upper-end portion of the outer periphery of the circuit board 10 in the present embodiment, as illustrated in FIGS. 2 to 7. The male connection portion 20 is formed integrally with the circuit board 10 with the same thickness as the circuit board 10 so as to protrude upwards from the upper-end portion of the outer periphery of the circuit board 10. It should be noted that the male connection portion 20 does not have to protrude from the outer periphery of the circuit board 10. The male connection portion 20 is a plate portion that is substantially rectangular-shaped when seen from the front surface 30a of the casing 30. A plurality (six in the present embodiment) of electrically conductive pads 20a are formed on this male connection portion 20 so as to be exposed at the front surface and the rear surface of the male connection portion 20. The plurality of electrically conductive pads 20a are connected, respectively, to the plurality of conduction portions provided on the circuit board 10, to which the end portions of the U-phase coil, V-phase coil, and W-phase coil are connected, respectively. In the present embodiment, the plurality of electrically conductive pads 20a are constituted by two pads for braking and one pad for grounding as well as three pads for the U-phase coil, the V-phase coil, and the W-phase coil.

The male connection portion 20 is exposed from the opening 34 formed in the casing 30, as illustrated in FIGS. 2, 3, 5, 6 and 7. The circuit board 10 is attached to the end surface of the stator such that the top end of the male connection portion 20 is positioned in a location slightly below the upper surface of the attachment portion 32 as illustrated in FIG. 5.

Furthermore, the female connector 50 has a plurality (six in the present embodiment) of female contacts 60 that engage with the male connection portion 20, a connector housing 70 that accommodates these female contacts 60, and a hood 80 that accommodates the connector housing 70, as illustrated in FIG. 5 and FIGS. 8 to 13.

Figure 9:
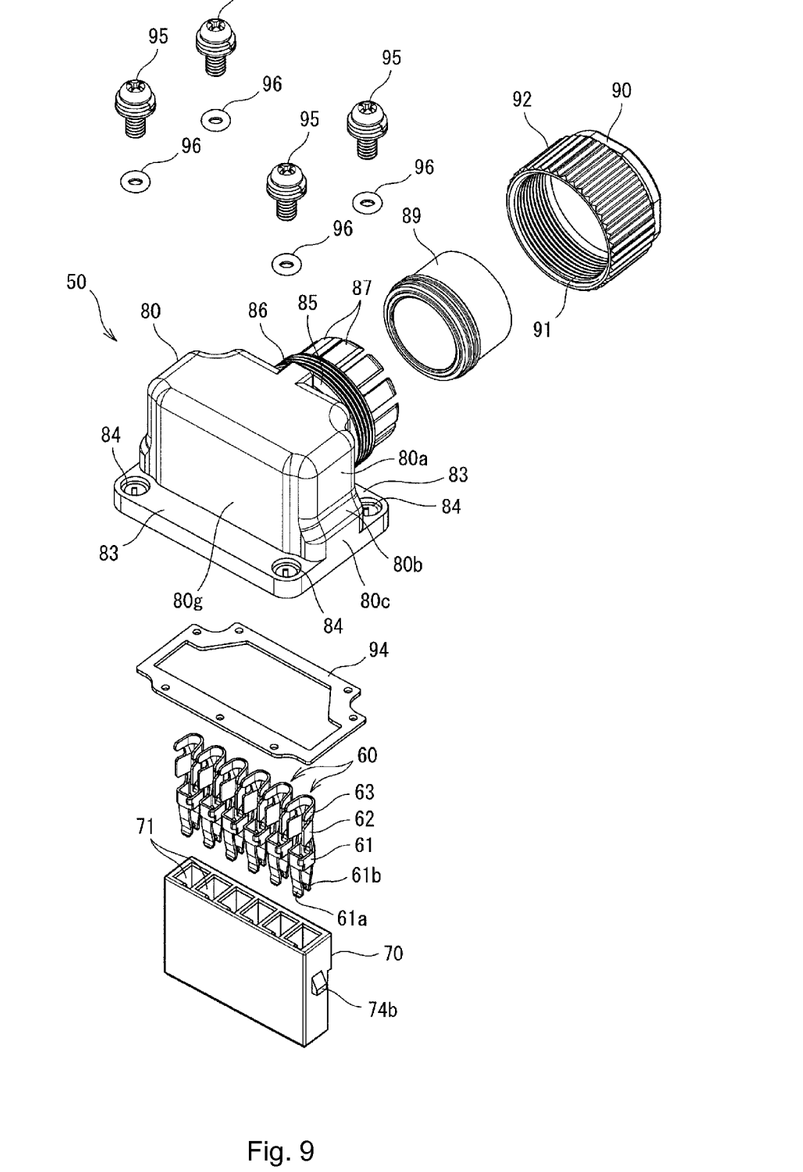
FIG. 9 is an exploded perspective view of the female connector illustrated in FIG. 1.
Figure 13:
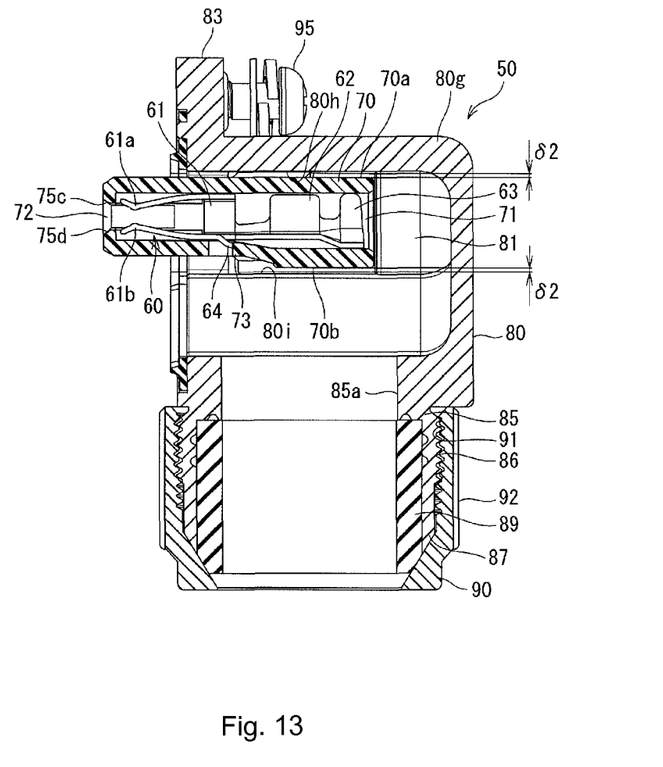
FIG. 13 is a cross-sectional view taken along line 13-13 in FIG. 11.

The female contacts 60 are formed by stamping and forming an electrically conductive metal sheet and are provided with a fixing portion 61 that is fixed to the connector housing 70, as illustrated in FIGS. 5, 9, and 13. The fixing portion 61 is formed in a box shape.

A contact lance 64 is provided on the lower wall (the right wall in FIG. 5) of the fixing portion 61 as illustrated in FIGS. 5 and 13. The female contacts 60 are accommodated, respectively, inside contact-accommodating chambers 71, which are described hereinafter, formed in the connector housing 70. At such time, the female contacts 60 are fixed in the connector housing 70 due to the contact lances 64 locking with locking portions 73 provided in the connector housing 70.

Furthermore, each female contact 60 is provided with a pair of contact arms 61a and 61b that extend respectively from the front ends (the lower ends in FIG. 5) of the upper wall and lower wall of the fixing portion 61. When the female contacts 60 engage with the male connection portion 20, the male connection portion 20 is received between the pairs of contact arms 61a and 61b as illustrated in FIG. 6. At such time, each pair of contact arms 61a and 61b elastically deforms and comes into contact with the electrically conductive pads 20a that are exposed at the front surface and rear surface of the male connection portion 20. In addition, each female contact 60 is provided with a core wire barrel 62 and an insulation barrel 63 that extend from the rear end (the upper end in FIG. 5) of the lower wall of the fixing portion 61. The core wire barrels 62 of the female contacts 60 crimp-connect the core wire of each electrical wire (not depicted) of a power supply-use cable C (see FIG. 5), and the insulation barrels 63 crimp the covering of each electrical wire of the power supply-use cable C.

Figure 8:
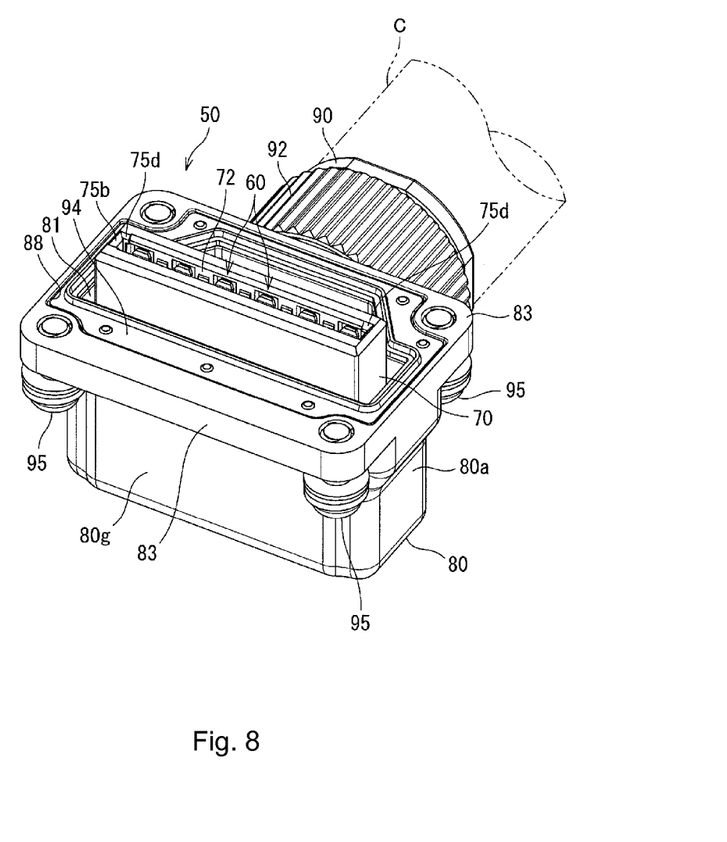
FIG. 8 is a perspective view of the female connector illustrated in FIG. 1 as seen from the bottom surface side.
Figure 10:
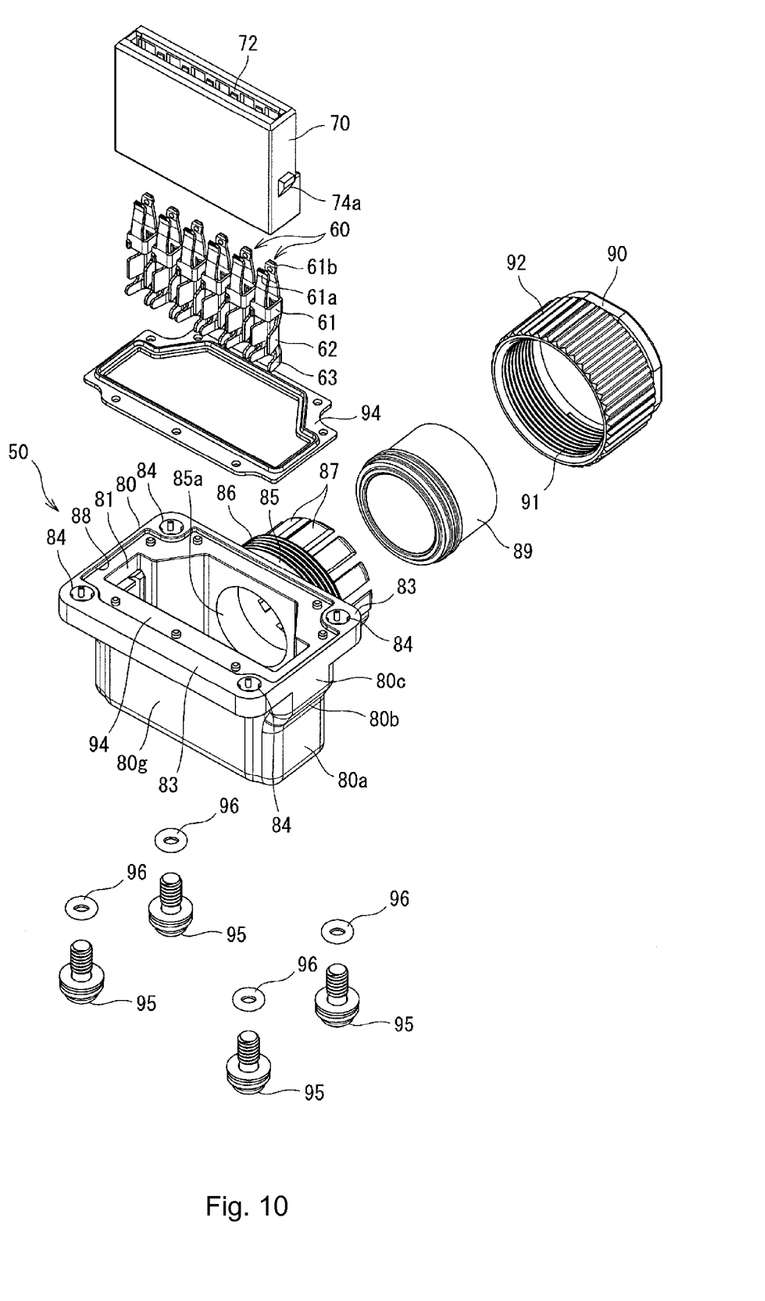
FIG. 10 is an exploded perspective view of the female connector illustrated in FIG. 1 as seen from the bottom surface side.

Furthermore, the connector housing 70 has a substantially cuboid shape as illustrated in FIGS. 8 to 10 and is formed by moulding an insulating synthetic resin. Also, the connector housing 70 is provided with a plurality (six in the present embodiment) of the contact-accommodating chambers 71 that accommodate the plurality of female contacts 60 respectively, as illustrated in FIGS. 5, 9, and 13. The plurality of contact-accommodating chambers 71 is formed with a prescribed pitch in the longitudinal direction of the connector housing 70. Each contact—accommodating chamber 71 is open at the rear-end surface (the upper end surface in FIG. 5) of the connector housing 70 and extends towards the front side of the connector housing 70. Also, the locking portions 73 for fixing the female contacts 60 accommodated in the contact-accommodating chambers 71 are provided in sections corresponding to the contact-accommodating chambers 71 of the lower wall (the right wall in FIG. 5) of the connector housing 70.

Figure 11:
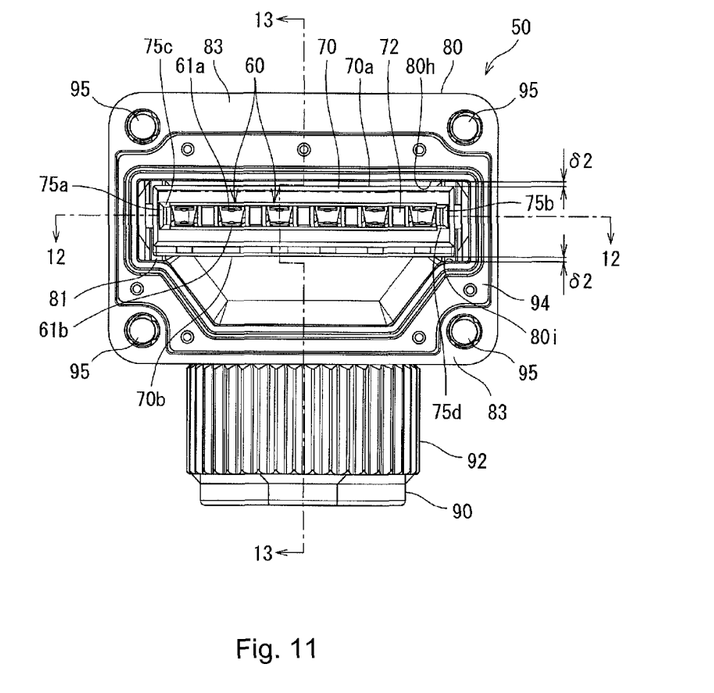
FIG. 11 is a bottom view of the female connector illustrated in FIG. 1.

Furthermore, a rectangular-shaped guide opening 72, sized to enable reception of the male connection portion 20, is provided in the front-end surface of the connector housing 70 as illustrated in FIGS. 5, 8, 11, and 13. The guide opening 72 is formed so as to pass through from the front-end surface of the connector housing 70 towards the contact-accommodating chambers 71. Also, pairs of oblique guide surfaces 75c and 75d are formed at the upper edge (the left edge in FIG. 5) and the lower edge of a front edge entrance to the guide opening 72 as illustrated in FIGS. 5, 11, and 13. Furthermore, a pair of oblique guide surfaces 75a and 75b is formed at the left end (the left end in FIG. 11) and the right end in the longitudinal direction of the front edge entrance to the guide opening 72 as illustrated in FIGS. 11 and 12.

In addition, a pair of locking protrusions 74a and 74b is provided on the left side surface (the left side surface in FIG.

Figure 12:
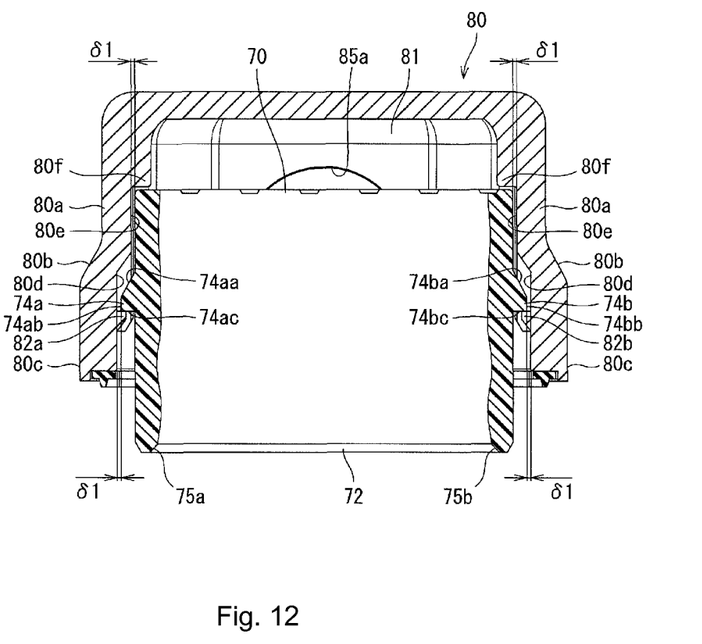
FIG. 12 is a cross-sectional view taken along line 12-12 in FIG. 11.

11) and the right side surface in the longitudinal direction of the connector housing 70 as illustrated in FIGS. 9 to 12. The locking protrusions 74a and 74b protrude outwards from the left side surface and right side surface, respectively, and lock with locking protrusions 82a and 82b of the hood 80 described hereinafter, as illustrated in FIG. 12. The locking protrusion 74a on the left side is provided with an oblique surface 74aa, an outside surface 74ab, and a front-end surface 74ac as illustrated in FIG. 12. The oblique surface 74aa extends obliquely outward and forward from the left side surface of the connector housing 70 and the outside surface 74ab extends parallel with the left side surface, forward from the outer end of the oblique surface 74aa. The front-end surface 74ac extends from the front end of the outside surface 74ab so as to be perpendicular with the left side surface, and locks with the rear surface of the locking protrusion 82a of the hood 80 to prevent disengagement from the front of the connector housing 70. Furthermore, the locking protrusion 74b on the right side is provided with an oblique surface 74ba, an outside surface 74bb, and a front-end surface 74bc as illustrated in FIG. 12. The oblique surface 74ba extends obliquely outward and forward from the right side surface of the connector housing 70 and the outside surface 74bb extends parallel with the right side surface forward from the outer end of the oblique surface 74ba. The front-end surface 74bc extends from the front end of the outside surface 74bb so as to be perpendicular with the right side surface and locks with the rear surface of the locking protrusion 82b of the hood 80 to prevent disengagement from the front of the connector housing 70.

Furthermore, the hood 80 that accommodates the connector housing 70 has a substantially cuboid shape as illustrated in FIGS. 8 to 10 and is formed by moulding a synthetic resin. A housing accommodating space 81 that accommodates the connector housing 70 is formed in this hood 80 as illustrated in FIGS. 5, 8, 10, 12, and 13. The housing accommodating space 81 is open at the front surface (the lower surface in FIG. 5) of the hood 80 and extends towards the rear of the hood 80. Each of the left and right sidewalls (the sidewalls to the left and right in FIG. 12) of the hood 80 is made up of a first sidewall portion 80a, a second sidewall portion 80b, and a third sidewall portion 80c as illustrated in FIG. 12. The first sidewall portion 80a extends forward from the rear wall of the hood 80 and the second sidewall portion 80b extends obliquely outwards in the lateral direction and forward from the front end of the first sidewall portion 80a. The third sidewall portion 80c extends forwards from the front end of the second sidewall portion 80b. The housing accommodating space 81 is delimited in the lateral direction by the first sidewall portions 80a, the second sidewall portions 80b, and the third sidewall portions 80c. Also, on the third sidewall portion 80c on the left side, the locking protrusion 82a with which the locking protrusion 74a of the connector housing 70 locks is formed protruding inward in the lateral direction from the third sidewall portion 80c. Furthermore, on the third sidewall portion 80c on the right side, the locking protrusion 82b with which the locking protrusion 74b of the connector housing 70 locks is formed protruding inward in the lateral direction from the third sidewall portion 80c. In addition, on the first sidewall portions 80a on both the left and right sides, a stopper step portion 80f that regulates backward movement of the connector housing 70 accommodated inside the housing accommodating space 81 is formed protruding inward in the lateral direction. It should be noted that the external surface of the second sidewall portion 80b may extend upward in a linear manner without variation from the external surface of the third sidewall portion 80c.

With reference to FIG. 12, consideration will be given to the dimensions in the lateral width direction of the housing accommodating space 81 and the connector housing 70 in the case where the connector housing 70 is accommodated in a normal state in the housing accommodating space 81. In this case, the dimensions are set such that a gap 61 is formed between the outside surface 74ab of the locking protrusion 74a on the left side of the connector housing 70 and the inside surface 80d of the third sidewall portion 80c of the hood 80. On the opposing side, the dimensions are set such that a gap 61 is formed between the outside surface 74bb of the locking protrusion 74b on the right side of the connector housing 70 and the inside surface 80d of the third sidewall portion 80c of the hood 80. Furthermore, the dimensions are set such that a gap $\delta 1$ is formed between the left side surface of the connector housing 70 and the inside surface 80e of the first sidewall portion 80a of the hood 80. On the opposing side, the dimensions are set such that a gap $\delta 1$ is formed between the right side surface of the connector housing 70 and the inside surface 80e of the first sidewall portion 80a of the hood 80. Thus, the dimensions of the connector housing 70 and the housing accommodating space 81 are set such that gaps in the lateral width direction of a total $2\delta 1$ are formed between the connector housing 70 and the left and right sidewalls of the hood 80.

Furthermore, with reference to FIGS. 11 and 13, consideration will be given to the dimensions in the vertical direction of the housing accommodating space 81 and the connector housing 70 in the case where the connector housing 70 is accommodated in a normal state in the housing accommodating space 81. In this case, the dimensions are set such that a gap $\delta 2$ is formed between the upper surface 70a of the connector housing 70 and the inside surface 80h of an upper wall 80g of the hood 80. On the opposing side, the dimensions are set such that a gap $\delta 2$ is formed between the lower surface 70b of the connector housing 70 and the inside surface 80i of the housing accommodating space 81 of the hood 80. Thus, the dimensions of the connector housing 70 and the housing accommodating space 81 are set such that gaps in the vertical direction of a total $2\delta 2$ are formed between the connector housing 70 and the inside surface 80h and inside surface 80i of the hood 80.

In this way, the dimensions of the connector housing 70 and the housing accommodating space 81 are set such that gaps in the lateral width direction of a total $2\delta 1$ are formed between the connector housing 70 and the left and right sidewalls of the hood 80. Furthermore, the dimensions of the connector housing 70 and the housing accommodating space 81 are set such that gaps in the vertical direction of a total $2\delta 2$ are formed between the connector housing 70 and the inside surface 80h and the inside surface 80i of the hood 80. Therefore, the connector housing 70 is held by the hood 80 so as to be able to move in the lateral width direction and the vertical direction. Here, the lateral width direction and the vertical direction of the connector housing 70 correspond to planar directions that are orthogonal to the direction in which engagement is performed with the male connection portion 20 on the motor 1 side, as illustrated in FIG. 5 and FIG. 6. Accordingly, the connector housing 70 is held by the hood 80 so as to be able to move in planar directions that are orthogonal to the direction in which engagement is performed with the male connection portion 20. Also, an attachment flange 83 is provided on each of the upper wall 80g and the lower wall of the hood 80 so as to protrude outward from the upper wall 80g and the lower wall. A total of four attachment screw-use through holes 84 are formed in both longitudinal corner portions of each attachment flange 83.

Furthermore, a cable-use opening 85a for introducing the power supply-use cable C is formed in the lower wall of the hood 80 as illustrated in FIGS. 5, 6, 10, and 13. In addition a cylindrical portion 85 that surrounds that cable-use opening 85a is formed protruding downward in the lower wall of the hood 80. Also, a threaded portion 86 is formed on the outer periphery of the cylindrical portion 85 and a plurality of fin portions 87 is provided at uniform intervals in the circumferential direction at the tip end of the cylindrical portion 85. It should be noted that the fin portions 87 do not have to be provided. A cylindrical waterproof rubber portion 89 is then inserted on the inner peripheral side of the cylindrical portion 85 as illustrated in FIGS. 5, 6, 9, 10, and 13. A threaded portion 91 of a waterproof rubber portion fastening member 90 is screwed together with the threaded portion 86 on the outer peripheral side of the cylindrical portion 85. The internal diameter of the waterproof rubber portion 89 is approximately the same as the diameter of the cable-use opening 85a as illustrated in FIGS. 5, 6, and FIG. 13. When the power supply-use cable C is attached, the tip end of the power supply-use cable C is inserted so as to pass through an inside through hole of the waterproof rubber portion 89 and be positioned inside the cable-use opening 85a as illustrated in FIG. 5. Then, screwing the waterproof rubber portion fastening member 90 onto the cylindrical portion 85 causes the waterproof rubber portion 89 to press hard on the power supply-use cable C from the outer peripheral side of the power supply-use cable C. The space between the waterproof rubber portion 89 and the power supply-use cable C is thereby sealed. Furthermore, an annular recessed portion 88 is formed in the front-end surface of the hood 80 so as to surround the opening in the housing accommodating space 81 as illustrated in FIGS. 8 and 10. An annular waterproof seal member 94 is then fitted into this recessed portion 88.

Next, a method for assembling the female connector 50 and a method for attaching the assembled female connector 50 to the motor 1 will be described with reference to FIGS. 5, 6, and 12. First, the tip end of the power supply-use cable C is passed through the waterproof rubber portion fastening member 90 and the inside through hole of the waterproof rubber portion 89 and inserted inside the cable-use opening 85a in the hood 80. Next, the electrical wires of the power supply-use cable C are crimp-connected to the core wire barrels 62 and the insulation barrels 63 of the female contacts 60. Thereafter, the female contacts 60 are inserted into the contact-accommodating chambers 71 from the rear side of the connector housing 70 with the pairs of contact arms 61a and 61b leading. The contact lances 64 of the female contacts 60 are thereby locked with the locking portions 73 of the connector housing 70 and the female contacts 60 are thereby fixed to the connector housing 70.

As illustrated in FIG. 12, the connector housing 70 is inserted inside the housing accommodating space 81 from the front side of the hood 80 with the rear-end side of the connector housing 70 leading. Thus, the locking protrusions 74a and 74b of the connector housing 70 pass over the locking protrusions 82a and 82b of the hood 80 and the connector housing 70 is locked to the hood 80. Here, backward movement of the connector housing 70 is prevented by the rear-end surface of the connector housing 70 abutting the stopper step portions 80f of the hood 80. Furthermore, forward movement of the connector housing 70 is prevented by the front-end surfaces 74ac and 74bc of the locking protrusions 74a and 74b of the connector housing 70 abutting the rear surfaces of the locking protrusions 82a and 82b of the hood 80. Thereafter, screwing the waterproof rubber portion fastening member 90 onto the cylindrical portion 95 causes the waterproof rubber portion 89 to press hard on the power supply-use cable C from the outer peripheral side of the power supply-use cable C. The power supply-use cable C is thereby attached to the female connector 50 in a state in which the space between the waterproof rubber portion 89 and the power supply-use cable C is sealed. The waterproof seal member 94 is then fitted into the recessed portion 88 of the hood 80, thereby completing the assembly of the female connector 50.

In the female connector 50 assembled in this way, the front-end surface of the hood 80 and the front-end surface of the connector housing 70 face downward as illustrated in FIG. 5. In this state, the female connector 50 is lowered and the tip end of the connector housing 70 is inserted into the opening 34 formed in the casing 30 of the motor 1, as illustrated in FIG. 6. Thus, the male connection portion 20 on the motor 1 side passes through the guide opening 72 in the connector housing 70 and is received between the pairs of contact arms 61a and 61b of the female contacts 60. Thus, the pairs of contact arms 61a and 61b elastically deform and come into contact with the electrically conductive pads 20a exposed at the front surface and the rear surface of the male connection portion 20, such that the electrically conductive pads 20a are inserted between the pairs of contact arms 61a and 61b. As a result, the circuit board 10 on the motor 1 side and the power supply-use cable C are connected via the male connection portion 20 and the female contacts 60. Here, because the pairs of contact arms 61a and 61b come into contact with the electrically cylindrical portion 85, conductive pads 20a are exposed at the front surface and the rear surface of the male connection portion 20 and contact reliability can be increased compared to when only one contact arm comes into contact with an electrically conductive pad 20a.

In this way, according to the motor 1 and the female connector 50 of the present embodiment, the male connection portion 20 is provided formed in part of the outer periphery of the circuit board 10 and the male connection portion 20 is exposed to the outside from the opening 34 formed in the casing 30 on the motor 1 side. Also, the female connector 50, connected to the power supply-use cable C, is able to engage with the male connection portion 20. Therefore, when the power supply-use cable C and the circuit board 10 on the motor 1 side are connected, it is sufficient to engage the female connector 50 with the male connection portion 20 formed in part of the outer periphery of the circuit board 10 and it is not necessary to provide a connector on the circuit board 10 on the motor 1 side. Thus, the number of components can be reduced and, since there is no need to carry out work to mount the connector on the circuit board 10 on the motor 1 side, the number of assembly man-hours can be reduced.

Also, once the female connector 50 has been engaged with the male connection portion 20 on the motor 1 side, four attachment screws 95 are then inserted into the attachment screw-use through holes 84 of the hood 80 together with O-rings 96 and are screw-fixed to the female threaded portions 33 on the motor 1 side, as illustrated in FIG. 1. The hood 80 of the female connector 50 is thereby fixed to the motor 1. At such time, the waterproof seal member 94 on the female connector 50 side is seated on the attachment portion 32 on the motor 1 side as illustrated in FIG. 6. The space between the hood 80 of the female connector 50 and the attachment portion 32 of the casing 30 of the motor 1 is thereby sealed. It should be noted that the O-rings 96 do not have to be provided.

It should be noted that, on the motor 1 side, when the circuit board 10 is accommodated inside the through hole 31 of the casing 30, the positions of the circuit board 10 and the male connection portion 20 often shift in a direction that is orthogonal to the direction in which the female connector 50 is engaged with the male connection portion 20. Here, in the female connector 50 of the present embodiment, as previously mentioned, the connector housing 70 is held by the hood 80 so as to be able to move in planar directions that are orthogonal to the direction in which engagement is performed with the male connection portion 20. Therefore, even if the position of the male connection portion 20 shifts in a direction that is orthogonal to the engagement direction, when the tip end of the connector housing 70 is inserted inside the opening 34, the connector housing 70 follows the male connection portion 20 when moving.

Accordingly, even if the position of the male connection portion 20 shifts in a direction that is orthogonal to the engagement direction, the male connection portion 20 passes through the guide opening 72 in the connector housing 70 and is suitably received between the pairs of contact arms 61a and 61b of the female contacts 60. Here, the pairs of oblique guide surfaces 75c and 75d are formed respectively at the upper edge (the left edge in FIG. 5) and the lower edge of the front edge entrance to the guide opening 72 in the connector housing 70 as illustrated in FIG. 5. Furthermore, the pair of oblique guide surfaces 75a and 75b is formed respectively at the left end (the left end in FIG. 11) and the right end in the longitudinal direction of the front edge entrance to the guide opening 72 as illustrated in FIGS. 11 and 12. That is, the oblique guide surfaces 75a and 75b and also 75c and 75d are formed at edges in directions that are orthogonal to the engagement direction, in the entrance to the guide opening 72 of the connector housing 70. Therefore, if the position of the male connection portion 20 has shifted in a direction that is orthogonal to the engagement direction, the tip end of the male connection portion 20 abuts either the pairs of oblique guide surfaces 75c and 75d or the pair of oblique guide surfaces 75a and 75b of the guide opening 72. Therefore, the connector housing 70 is able to easily follow the male connection portion 20 when moving.

An embodiment of the present invention has been described hereinabove; however, the present invention is not restricted thereto and it is possible for various alterations and improvements to be carried out. For example, a description has been given in which the power supply-use cable C is attached to the female connector 50. However, the female connector 50 may be shipped to a customer in a state in which the connector housing 70 accommodating the plurality of female contacts 60 is held by the hood 80 and the power supply-use cable C may be connected to the female contacts 60 by that customer. Furthermore, it is sufficient for the male connection portion 20 to be formed in part of the outer periphery of the circuit board 10 and to be exposed from the opening 34 formed in the casing 30 without it being necessary for the male connection portion 20 to be formed in the upper-end portion of the outer periphery of the circuit board 10.

In addition, the circuit board 10 does not have to have an annular shape. Furthermore, in the female contacts 60, besides pairs of the contact arms 61a and 61b coming into contact with the electrically conductive pads 20a, there may be one contact arm and this contact arm may come into contact with one surface of an electrically conductive pad 20a. In addition, the locking protrusions of the connector housing 70 may have a cantilevered housing lance form.

Furthermore, the female connector of the present invention may be used not only for supplying electricity to a motor but also for transmitting signals to an encoder circuit. In such case, a signal transmission-use cable is used rather than a power supply-use cable.

What is claimed is:

1. A motor comprising:
    a casing having an opening extending through an outer surface of the casing;
    a stator having coils within the casing;
    a rotor within the casing;
    a circuit board within the casing connected to the coils of the stator;
    a male connection portion in the opening of the casing integral with the circuit board, the male connection portion positioned in the opening so as not to protrude beyond the outer surface of the casing and being accessible from outside the casing; and
    a female connector engaged with the male connection portion.

2. The motor according to claim 1 wherein the casing has a through hole extending from a front surface of the casing to a rear surface of the casing and the stator, the rotor, and the circuit board are in the through hole of the casing.

3. The motor according to claim 2 wherein the circuit board is an annular plate and is attached to the stator.

4. The motor according to claim 3 wherein the coils of the stator are a U-phase coil, a V-phase coil, and a W-phase coil.

5. The motor according to claim 4 wherein:
    (a) the circuit board has a plurality of conduction portions connected to the U-phase coil, the V-phase coil, and the W-phase coil, and
    (b) the male connection portion has a plurality of electrically conductive pads connected to the conduction portions of the circuit board.

6. The motor according to claim 5 wherein:
    (a) two of the electrically conductive pads of the male connection portion are braking pads,
    (b) one of the electrically conductive pads of the male connection portion is a grounding pad,
    (c) one of the electrically conductive pads of the male connection portion is a U-phase coil pad,
    (d) one of the electrically conductive pads of the male connection portion is a V-phase coil pad, and
    (e) one of the electrically conductive pads of the male connection portion is a W-phase coil pad.

7. The motor according to claim 6 wherein the casing is a substantially cuboid-shaped metal member.

8. The motor according to claim 1 wherein the female connector further includes:
    (a) a hood fixed to the casing of the motor,
    (b) a connector housing held by the hood and movable in a planar direction that is orthogonal to a direction in which the female connector is engaged with the male connection portion,
    (c) a female contact within the connector housing and engaged with the male connection portion.

* * * * *